(12) United States Patent
Strayer et al.

(10) Patent No.: US 7,069,720 B2
(45) Date of Patent: **\*Jul. 4, 2006**

(54) CYLINDER EVENT BASED FUEL CONTROL

(75) Inventors: Ben Allen Strayer, Belleville, MI (US); Daniel Lawrence Meyer, Dearborn, MI (US); Frank Gonzales, Jr., Garden City, MI (US); Garth Michael Meyer, Dearborn, MI (US); Michael Smokovitz, Canton, MI (US); Donald James Lewis, Howell, MI (US)

(73) Assignee: Ford Global Techologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/175,633

(22) Filed: Jul. 5, 2005

(65) Prior Publication Data

US 2005/0241619 A1    Nov. 3, 2005

Related U.S. Application Data

(63) Continuation of application No. 10/375,511, filed on Feb. 26, 2003, now Pat. No. 6,931,840.

(51) Int. Cl.
*F02N 9/00* (2006.01)
*F02D 43/04* (2006.01)

(52) U.S. Cl. .................... 60/285; 123/406.47
(58) Field of Classification Search .................... None
See application file for complete search history.

(56) References Cited

U.S. PATENT DOCUMENTS

| | | | |
|---|---|---|---|
| 5,690,075 A * | 11/1997 | Tanaka et al. | 123/491 |
| RE36,737 E * | 6/2000 | Brehob et al. | 123/299 |
| 6,931,840 B1 * | 8/2005 | Strayer et al. | 60/285 |
| 2003/0075152 A1 * | 4/2003 | Joos et al. | 123/406.53 |
| 2004/0144369 A1 * | 7/2004 | Song et al. | 123/486 |

\* cited by examiner

*Primary Examiner*—Andrew M. Dolinar
(74) *Attorney, Agent, or Firm*—Allan J. Lippa; Alleman Hall McCoy Russell & Tuttle LLP

(57) ABSTRACT

A method to deliver fuel during a start for an internal combustion engine is described. The method provides individual cylinder fuel control based on the number of fueled cylinder events. The method offers improved engine emissions while maintaining engine run-up performance.

18 Claims, 5 Drawing Sheets

FNEVTCLD

| | -30 | -20 | 0 | 20 | 40 | 70 | 100 | 150 | 165 | 180 | 195 | 210 |
|---|---|---|---|---|---|---|---|---|---|---|---|---|
| 20040 | 0 | 0 | 0 | 0 | 0 | 0 | 0 | 0 | 0 | 0 | 0 | 0 |
| 4800 | 0 | 0 | 0 | 0 | 0 | 0 | 0 | 0 | 0 | 0 | 0 | 0 |
| 3600 | 0 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 | 0 |
| 1200 | 0.1 | 0.04 | 0.03 | 0 | 0 | 0 | 0 | 0 | 0 | 0 | 0 | 0 |
| 800 | 0.15 | 0.08 | 0.06 | 0.03 | 0.008 | 0 | 0 | 0 | 0 | 0 | 0 | 0 |
| 480 | 0.3 | 0.25 | 0.22 | 0.12 | 0.1 | 0.03 | 0 | 0 | 0 | 0 | 0 | 0 |
| 320 | 0.48 | 0.44 | 0.34 | 0.26 | 0.2 | 0.1 | 0.1 | 0 | 0 | 0 | 0 | 0 |
| 203 | 0.55 | 0.52 | 0.4 | 0.32 | 0.26 | 0.2 | 0.1 | 0 | 0 | 0 | 0 | 0 |
| 83 | 0.58 | 0.56 | 0.48 | 0.44 | 0.34 | 0.296 | 0.17 | 0.048 | 0 | 0 | 0 | 0 |
| 11 | 0.6 | 0.6 | 0.56 | 0.54 | 0.5 | 0.45 | 0.22 | 0.2 | 0.06 | 0.03 | 0.06 | 0.06 |
| 0 | 0.63 | 0.62 | 0.6 | 0.56 | 0.54 | 0.5 | 0.35 | 0.296 | 0.132 | 0.093 | 0.1 | 0.07 |

Figure 6

FNEVTLOST

| | -20 | 20 | 70 | 150 | 180 | 210 |
|---|---|---|---|---|---|---|
| 20400 | 0 | 0 | 0 | 0 | 0 | 0 |
| 4800 | 0 | 0 | 0 | 0 | 0 | 0 |
| 3600 | 0 | 0 | 0 | 0 | 0 | 0 |
| 1600 | 0.06 | 0.03 | 0 | 0 | 0 | 0 |
| 1200 | 0.06 | 0.03 | 0 | 0 | 0 | 0 |
| 800 | 0.1 | 0.05 | 0 | 0 | 0 | 0 |
| 480 | 0.1 | 0.05 | 0.09 | 0.02 | 0.07 | 0 |
| 200 | 0.12 | 0.1 | 0.2 | 0.03 | 0.07 | 0.03 |
| 83 | 0.14 | 0.1 | 0.125 | 0.04 | 0.13 | 0.1 |
| 59 | 0.2 | 0.12 | 0.04 | 0.07 | 0.28 | 0.2 |
| 35 | 0.2 | 0.15 | 0.08 | 0.07 | 0.25 | 0.187 |
| 11 | 0.2 | 0.18 | 0 | 0.08 | 0.242 | 0.179 |
| 10 | 0.2 | 0.18 | 0 | 0.08 | 0.21 | 0.164 |
| 9 | 0.2 | 0.18 | 0 | 0.09 | 0.195 | 0.148 |
| 8 | 0.2 | 0.18 | 0 | 0.09 | 0.18 | 0.14 |
| 7 | 0.21 | 0.2 | 0 | 0.09 | 0.15 | 0.12 |
| 6 | 0.21 | 0.2 | 0 | 0.1 | 0.15 | 0.11 |
| 5 | 0.22 | 0.21 | 0.218 | 0.1 | 0.1 | 0.1 |
| 4 | 0.21 | 0.2 | 0.203 | 0.1 | 0.1 | 0.1 |
| 3 | 0.22 | 0.21 | 0.1875 | 0.1 | 0.1 | 0.1 |
| 2 | 0.23 | 0.22 | 0.195 | 0.1 | 0.1 | 0.1 |
| 1 | 0.25 | 0.23 | 0.203 | 0.1 | 0.1 | 0.1 |
| 0 | 0.24 | 0.24 | 0.21 | 0.1 | 0.1 | 0.1 |

Figure 7

CYLINDER EVENT BASED FUEL CONTROL

CROSS-REFERENCE TO RELATED APPLICATIONS

This application is a continuation of and claims priority to application Ser. No. 10/375,511, filed on Feb. 26, 2003, now U.S. Pat. No. 6,931,840 entitled "Cylinder Event Based Fuel Control", assigned to the same assignee as the present application, and incorporated herein by reference in its entirety.

FIELD OF INVENTION

The present invention relates to a method for controlling an internal combustion engine and more particularly to a method for adjusting fuel based on the number of cylinder events during a start.

BACKGROUND OF THE INVENTION

Engine starting control has a significant impact on engine emissions and engine speed run-up. Fuel amount influences both torque and emissions. Torque is necessary to accelerate an engine from cranking speed up to idle speed. Further, low starting emissions are desirable when catalysts are cold and their efficiency is low. In general, fuel quantities producing air-fuel mixtures rich of stoichiometry increase engine torque while mixtures lean of stoichiometry reduce emissions during a start. Therefore, it is important to provide consistent and accurate fuel amounts to ensure engine speed run-up with reduced emissions.

One method to adjust fuel during a start is described in U.S. Pat. No. 4,432,325. This method provides for a metered fuel quantity maintained at a first constant value during a first phase of an engine starting period, the metered fuel quantity is changed to a threshold in accordance with an engine variable during the second phase of the engine starting period, and the metered fuel quantity is maintained at said threshold value during the third phase of said engine starting phase.

The inventors herein have recognized a disadvantage with this approach. That is, the approach neglects changing engine air amounts produced by engine pumping and changing engine speed. In other words, when an engine starts to turn it begins to pump down the intake manifold producing different air amounts in each cylinder during a start. When different cylinder air amounts are present with constant fueling, different in cylinder air-fuel ratios can be produced. This is an undesirable condition in terms of engine emissions and torque generation.

Another method to adjust fuel while an engine is cold is described in U.S. Pat. No. 5,870,986. This method provides an injection number counter means for counting a total number obtained by summing the fuel injection number in all cylinders from a start of an operation of the internal combustion engine; and a fuel injection timing changing means for advancing by a predetermined period a fuel injection start timing. When the counted value of said injection number counter means is less than a predetermined value, the fuel injection timing changing means sets the fuel injection start timing at a timing in synchronism with the intake stroke start timing of each cylinder. In the case where the above-described value of said injection number counter means is equal to or more than a predetermined value, the fuel injection start timing is set at a timing earlier than the intake stroke start timing of each cylinder.

The inventors herein have recognized a disadvantage of this approach as well. Namely, the approach injects fuel on an open valve in order to avoid having to compensate for fuel that attaches to engine surfaces when injecting fuel in a cold engine on a closed valve. However, injecting fuel on an open valve in a cold engine poses other issues. Specifically, open valve injection during a start may expose spark plug tips to raw fuel, potentially impeding the plugs from firing, raising engine emissions and producing inconsistent engine speed run-up or even preventing the engine from starting. In addition, open valve injection during a start may expose cylinder walls to injected fuel, washing cylinder walls with fuel, breaking down oil film, and causing scratches in the cylinder.

SUMMARY OF THE INVENTION

One embodiment of the present invention includes a fuel control method for an internal combustion engine. The method comprises: determining individual cylinder event air amounts; counting a number of fueled cylinder events from a start of the internal combustion engine; and adjusting cylinder fuel amount based on said counted number of fueled cylinder events and said individual cylinder event air amounts. This method can be used to reduce the above-mentioned limitations of the prior art approaches.

By determining individual cylinder event air amounts and counting the number of fueled cylinder events, then delivering fuel based on the number of fueled cylinder events counted and cylinder event air amounts, the inventors herein have improved engine starting. In other words, the inventors herein have recognized, since engine air amount changes in each cylinder during a start and since the amount of fuel to achieve a desired air-fuel ratio changes based on the number of fueled cylinder events, fuel delivery based on the number of cylinder events and individual cylinder air amounts improves engine air-fuel control. Therefore, fueling based on fueled cylinder events and individual cylinder air amounts can be used to lower engine emissions and to provide uniform engine run-up speed during starting.

Furthermore, the inventors herein have recognized that engine fuel requirements are a function of the number of fueled cylinder events rather than solely based on time. Cylinder events can be associated with mechanical dimensions; time is a continuum, which lacks spatial dimensions and linkage to the physical engine. Therefore, engine fueling based on the number of fueled cylinder events reduces the fuel variation associated with time based fueling.

In another aspect of the invention, the present invention provides another fuel control method for an internal combustion engine, comprising: injecting fuel at least onto closed intake valves from the start of the internal combustion engine; counting a number of fueled cylinder events from a start of said internal combustion engine; and adjusting said injected fuel amount based on said counted number of fueled cylinder events.

As a result of injecting fuel onto closed intake valves from the start and basing the injected fuel amount on the number of fueled cylinder events, the inventors herein have improved engine starting. Since, injecting on a closed valve reduces the chances of exposing spark plugs and cylinder walls to fuel and since the amount of fuel to achieve a desired air-fuel ratio changes based on the number of fueled cylinders, engine starting is improved and engine emissions are reduced. Note that after start, one can continue to inject on closed valves or open valves, or a combination of the two.

The present invention provides a number of advantages. The present invention provides the advantage of improved air-fuel control during engine starting, resulting in lower emissions. This advantage is especially beneficial when a catalyst is cold and its efficiency is low. In addition, the present invention improves engine run-up speed consistency. Repeatable engine speed during starting improves owner confidence and satisfaction since the engine behaves in a reliable and predictable manor.

The above advantages and other advantages and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Description of Invention, with reference to the drawings, wherein:

FIG. 6 is a table of example fuel subtracted from a based desired Lambda during open loop operation;

FIG. 7 is a table of example fuel subtracted from a base desired Lambda that represents lost fuel.

DESCRIPTION OF INVENTION

Figure 1:
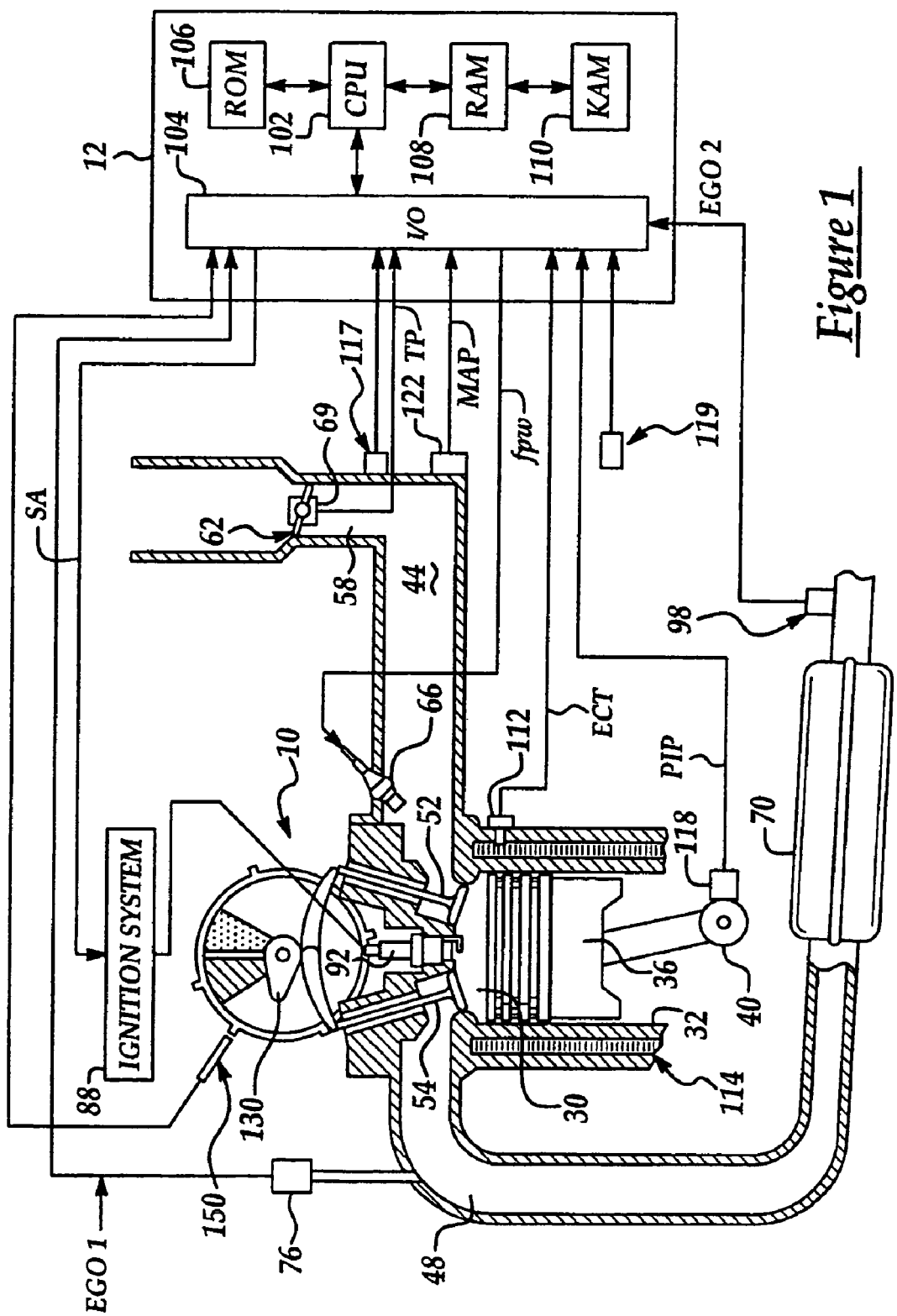
FIG. 1 is a schematic diagram of an engine wherein the invention is used to advantage.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with cam shaft 130 and piston 36 positioned therein and connected to crankshaft 40. Combustion chamber 30 is known communicating with intake manifold 44 and exhaust manifold 48 via respective intake valve 52 an exhaust valve 54. Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. Intake manifold 44 is shown communicating with throttle body 58 via throttle plate 62.

Conventional distributorless ignition system 88 provides ignition spark to combustion chamber 30 via spark plug 92 in response to controller 12. Two-state exhaust gas oxygen sensor 76 is shown coupled to exhaust manifold 48 upstream of catalytic converter 70. Alternatively, a Universal Exhaust Gas Oxygen (UEGO) sensor may be substituted for two-state sensor 76. Two-state exhaust gas oxygen sensor 98 is shown coupled to exhaust manifold 48 downstream of catalytic converter 70. Sensor 76 provides signal EGO1 to controller 12.

Controller 12 is shown in FIG. 1 as a conventional microcomputer including: microprocessor unit 102, input/output ports 104, and read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold absolute pressure (MAP) form pressure sensor 122 coupled to intake manifold 44; a measurement (ACT) of engine air amount temperature or manifold temperature from temperature sensor 117; a cam position signal (CAM) from cam sensor 150; and a profile ignition pickup signal (PIP) from a Hall effect sensor 118 coupled to a crankshaft 40, and an engine speed signal (RPM) from engine speed sensor 119. In a preferred aspect of the present invention, engine speed sensor 119 produces a predetermined number of equally spaced pulses every revolution of the crankshaft.

Figure 2:
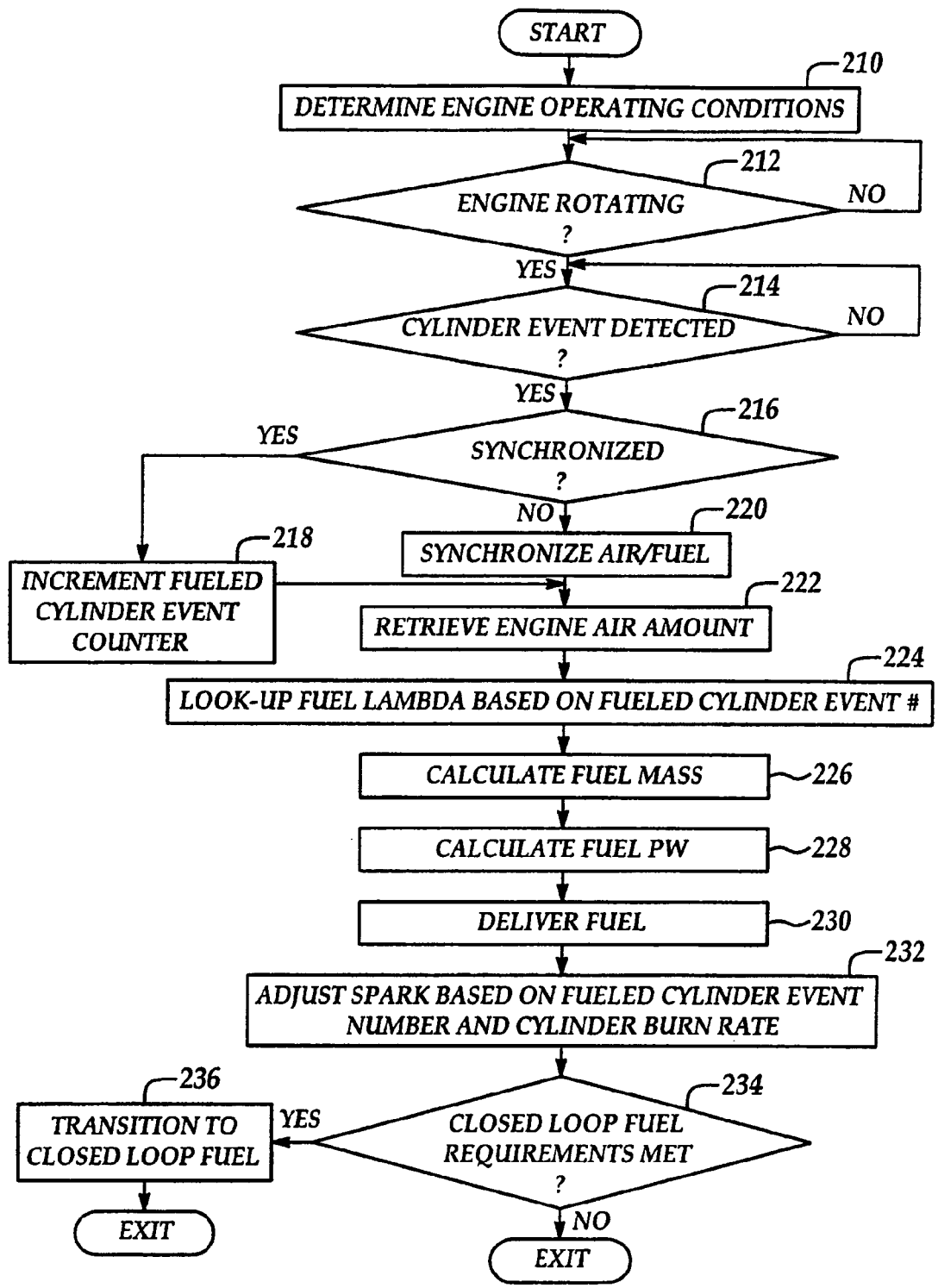
FIG. 2 is a high level flow chart describing sequential (SEFI) fueled cylinder event based fueling.

Referring to FIG. 2, a flowchart of a routine performed by controller 12 to control fuel based on a fueled cylinder event strategy is shown. The period of the cylinder event signal in degrees is: 720/number of engine cylinders. A cylinder event is identified or observed by decoding engine position based on CAM sensor 150 and PIP sensor 118 signals. The cylinder event signal identifies when a given engine cylinder reaches top-dead-center of compression stroke.

In step 210, engine operating conditions are read. Operating conditions are determined by measuring engine coolant temperature, catalyst temperature, time since engine last operated (soak time), and parameters alike. These parameters are used to compensate the engine fuel request in step 224. These parameters influence engine operation in different ways depending on their state. For example, low engine coolant temperatures provide air-fuel enrichment, but higher engine coolant temperatures provide air-fuel enleanment.

In step 212, the routine decides to proceed based on whether the engine is rotating. If the engine is not rotating, the routine waits until the crank position sensor 118 detects engine rotation. If the engine is rotating, the routine proceeds to step 214.

In step 214, the controller determines if a cylinder event has occurred, if so, the routine proceeds to step 216. If no new cylinder events have occurred, the routine waits until a cylinder event is observed.

In step 216, controller 12 determines if synchronization between controller 12 and engine 10 has occurred. Synchronization occurs when engine timing is aligned with engine controller operation. If synchronization has occurred the routine proceeds to step 218, if not, the routine proceeds to step 220.

In step 218, the number of fueled cylinder events is incremented since a cylinder event has been detected and the engine and controller 12 are in synchronization, allowing fuel delivery. The number of fueled cylinder events is used as the row index when FNEVTCLD, FIG. 6, and FNEVTLOST, FIG. 7, are accessed to determine the desired Lambda value, relative air-fuel ratio, for the current fueled cylinder event.

In step 220, controller 12 observes cam and crank signals that allow determination of engine position. When engine position is established, engine controller 12 aligns operations, spark and fuel delivery, to engine timing, becoming synchronized. Fuel delivery is suspended until synchronization occurs. Upon synchronization the fueled cylinder event counter is set to zero and the routine continues to step 222 where an engine air amount prediction is retrieved from an engine air amount algorithm.

In step 222, an engine air amount for the next cylinder event is retrieved from an engine air amount algorithm. The intake manifold pressure 44 and intake manifold temperature 117 are sampled over an engine event and then a base individual cylinder air amount is calculated using the well-known ideal gas law equation PV=mRT. The ideal gas equation, written for a four-cylinder engine compensated for operating conditions is as follows:

$$Mcyl = \frac{D}{4RT} \cdot \eta(N, \text{load}) \cdot P_m \cdot FNBP(BP) \cdot FNTEM(ECT, ACT)$$

Where Mcyl is the engine air amount or cylinder air charge, D is the displacement of the engine, R is the gas constant, T is the engine air temperature. The symbol $\eta$ represents the engine volumetric efficiency, empirically determined, stored in a table with indices of engine speed and load. Manifold pressure, Pm is based on measuring a signal from pressure transducer 122. Barometric pressure compensation is stored as a function, FNBP, and is empirically determined so that it expresses the change in engine air amount as operating barometric pressure deviates from some nominal barometric pressure. Heat transfer between the engine and the engine air amount has an influence on volumetric efficiency and the engine air amount inducted. The table FNTEM is an empirically determined table that has x indices of engine coolant temperature (ECT) and y indices of engine air amount temperature (ACT). Based on these engine operating conditions, FNTEM provides compensation for heat transfer. The engine air amount is then used to calculate a predicted engine air amount since injection is typically done on a closed valve. The prediction is made by calculating the rate of change in air amount from the past two engine events, then using the rate of change and the duration between engine events to predict the future engine air amount. This example uses engine air amount in the current cylinder fuel calculation before the cylinder actually inducts the cylinder air charge. After the engine air amount has been retrieved the routine continues to step 224.

Alternatively, a mass air flow meter may be used to determine the engine air amount. By integrating the air mass signal over a cylinder event and then predicting future engine air amounts by extrapolation, using previous engine air amounts, a predicted engine air amount can be calculated.

In step 224, the desired Lambda for the up coming fueled cylinder event is calculated from tables FNEVTCLD, FIG. 6, and FNEVTLOST, FIG. 7. The tables have a row indices based on the number of fueled cylinder events and a column indices based on engine coolant temperature, or alternatively, cylinder head temperature. After the number of fueled cylinder events count is updated, in step 218, the count is used along with engine coolant temperature, from step 210, to determine the desired Lambda for the up coming fueling event. FNEVTCLD and FNEVTLOST values are interpolated by row and column to determine the desired up coming cylinder event Lambda. The desired Lambda is calculated by the equations: LAMBDA=BASEFUL−FNEVTCLD−FNEVTLOST, open loop, and by LAMBDA=BASEFUL−FNEVTLOST, closed loop. Lambda is separated into open and closed loop modes so that lost fuel can be taken into account in both modes of operation. When open loop, BASEFUL is the desired Lambda value interpolated from a table based on engine speed and load. When closed loop, BASEFUL takes on a value that dynamically moves about the value of one based on the state of oxygen sensor 76. In general, the row index, number of fueled cylinder events, is calibrated to provide individual cylinder Lambda values for the first few engine cycles, then Lambda values are interpolated over a number of fueled cylinder events as the number of fueled cylinder events increase. Lambda is defined as follows:

$$\text{Lambda } (\lambda) = \frac{\frac{\text{Air}}{\text{Fuel}}}{\frac{\text{Air}}{\text{Fuel}_{stoichiometry}}}$$

The column index, engine coolant temperature is calibrated to account for changes in fuel vaporization and lost fuel as the engine and valve temperatures vary. The use of number of fueled cylinder events and engine coolant temperature as indices into determining individual cylinder Lambda allows very fine control of engine fuel during starting.

Alternatively, catalyst temperature may be used as a factor in determining the desired air-fuel ratio. The inventors herein have also recognized that catalyst temperature can be used as a factor in determining fuel amount. When a catalyst is cold, lean air-fuel ratios and spark retard can be used to increase catalyst temperatures and reduce tailpipe emissions. When a catalyst is warm and the engine has been stopped, oxygen diffuses into the catalyst. This allows the engine to operate rich after a start for a period without significantly increasing tailpipe emissions. Operating the engine rich for a period reduces engine NOx production and prepares the catalyst for increased NOx created during increased load conditions. To compensate for catalyst temperature, the Lambda calculation is modified by another term, FNEVTCAT. The desired Lambda equation with catalyst temperature compensation is: LAMBDA=BASEFUL−FNEVTCLD−FNEVTLOST+FNEVTCAT, open loop, and by LAMBDA=BASEFUL−FNEVTLOST+FNEVTCAT, closed loop. The function FNEVTCAT is of the same form as FIG. 6, but the x indices is catalyst temperature instead of engine coolant temperature. The y index remains fueled cylinder events. By using catalyst temperature as a factor in determining engine air-fuel ratio, engine operation can be tuned to reduce tailpipe emissions. The routine then continues on to step 226.

In step 226, individual cylinder fuel mass is calculated based on the desired Lambda calculated in step 224 and predicted engine air amount retrieved from step 222. Base fuel mass is calculated as follows:

$$\text{Base\_Fuel\_Mass} = \frac{\text{Engine\_Air\_Amount}}{\frac{\text{Air}}{\text{Fuel}_{stoichiometry}} * \text{Lambda}}$$

The fuel mass to be injected is further modified to reflect that a portion of the injected fuel mass may go into the formation of a fuel puddle in the intake manifold and that a portion of the fuel puddle may enter the cylinder depending on operating conditions. The fuel entering the engine cylinder is calculated as described by Aquino in S.A.E paper 810494 as follows:

$$\text{Final\_Fuel\_Mass} = (1 - X) * \text{Base\_Fuel\_Mass} + \frac{\text{Mass\_From\_Puddle}}{Tau}$$

The equation terms X and Tau represent the fraction of injected fuel entering the puddle X, and the time constant of the puddle, Tau. The terms are determined from values stored in tables whose values are empirically determined and based on manifold pressure, engine coolant temperature, and number of fueled cylinder events. The fuel puddle mass changes dynamically and is influenced by manifold pressure, engine temperature, and engine speed. The puddle mass increases at lower engine temperatures, higher manifold pressures, and low engine speeds. The puddle mass decreases at higher engine temperature, lower manifold pressures, and higher engine speeds. By keeping track of the fuel puddle mass and compensating for fuel entering or exiting the fuel puddle, the desired in cylinder air-fuel is created. The routine then proceeds to step 228.

In step 228, the fuel pulse width is determined from the calculated fuel mass and a function that represents the time to deliver a given fuel mass. The routine then continues on to step 230 where an injector is activated to deliver the desired fuel mass. The routine then advances to step 232.

In step 232, the routine passes the fueled cylinder event number to a spark delivery routine that can adjust spark based on the fueled cylinder event number and cylinder burn rate. Typically, desired spark is advanced if the burn rate is slower and retarded if the burn rate is faster. The burn rate is determined by the cylinder design and type of fuel, e.g., Gasoline, Ethanol, and Methanol. Base spark timing is retrieved from predetermined values stored in a table. The base spark table has x indices of engine coolant temperature and y indices of fueled cylinder events. If the burn rate of the fuel being used changes, a function FNBUR_SPK, alters the spark demand by adding an offset to the base spark. FNBUR_SPK is empirically determined and outputs spark offset as a function of burn rate. As the burn rate changes, depending on the fuel type, spark is advanced or retarded appropriately. In other words, the base spark angle that is based on the number of fueled cylinder events is modified based on cylinder burn rate. By linking spark angle to cylinder burn rate and fueled cylinder events, engine emissions can be reduced on a variety of fuel types. The routine then continues to step 234.

In step 234, engine operating conditions are evaluated to determine if closed loop fuel control is desired. Common signals used to determine desired closed loop engine operation include; time since start, exhaust gas sensor temperature, engine coolant temperature, and engine load. If closed loop fuel control is desired the routine proceeds to step 236 where fuel control transitions from open loop control to closed loop control by ramping fuel toward stoichiometry. If closed loop fuel control is not desired the routine exits until it is called again to determine fuel for the next cylinder.

Alternatively, another embodiment of the present invention delivers fuel based on the number of fueled cylinder events then transitions to time based fuel delivery. This method benefits from the advantages of fueling based on the number of fueled cylinder events during starting then reduces computations by using time based fueling.

Another alternative, simultaneous use of fueled cylinder event based and time based fueling also has advantages. Event based fueling offers the before-mentioned advantages. Time based fueling permits simplified calibration of fuel compensation for slower changing conditions, such as fuel vaporization. By using both methods, fuel amount can be compensated for engine conditions that change slowly and engine conditions that change rapidly without compromise.

The inventors herein developed the method of FIG. 2 having recognized that the amount of "lost fuel", unaccounted fuel that has been injected but is not present in the makeup of the exhaust stream, can have improved accuracy if it is based on the number of fueled cylinder events rather than solely based on time from start. When a cold engine is started, injected fuel may pass piston rings and end up in the crankcase. This phenomenon is due to cold clearances between pistons and cylinder bores. The unaccounted fuel passed to the crankcase is termed "lost fuel". The amount of lost fuel is a function of engine temperature and time since the engine last operated. If engine operating conditions produce lost fuel, the resulting exhaust air-fuel mixture is leaner than the desired air-fuel ratio produced by matching fuel amount to air amount. Since cylinder temperature affects piston-bore clearance and cylinder temperature increases by cylinder event, basing the amount of lost fuel on the number of fueled cylinder events provides a better approximation of the amount of lost fuel.

In addition, the inventors herein have recognized that during a start, time since the engine was last operated also factors into determining desired cylinder air-fuel. After the engine has stopped, fuel has an opportunity to evaporate from the intake manifold fuel puddle. The longer the engine is stopped, the more fuel evaporates from the fuel puddle. Since fuel in the puddle influences the in cylinder air-fuel ratio, the time fuel has to evaporate influences the in cylinder air-fuel ratio. A table, FNSOAK, provides compensation for fuel puddle mass as a function of time and engine coolant temperature. The table has x indices of engine coolant temperature and y indices of time since the engine last operated. Values in the table represent percent of fuel puddle mass lost to evaporation. The amount of fuel in the puddle from when the engine was last operated is multiplied by the interpolated value extracted from FNSOAK to determine the fuel puddle mass during a start. As the time since the engine last operated increases, the manifold fuel puddle mass decreases. Compensating for time since start can be used to improve the intake manifold fuel puddle estimate, thereby improving individual cylinder air-fuel mixtures when the engine is restarted.

Furthermore, the inventors herein have recognized that during a start, changes occur within an engine and its surroundings. The first few fired cylinders have an air fuel mixture that is composed of fresh charge and fuel. In other words, there is very little EGR or residuals during the first few combustion events. After the first few cylinders fire and expel their residuals, the residuals affect air fuel mixtures in other cylinders. Therefore, the combustion process in an engine is not only linked to time, but also to the number of cylinders receiving fuel.

The routine in FIG. 2 can be used to benefit from the above-mentioned recognized advantages. The advantages are achieved since the routine accounts for fuel, air, and spark on an individual cylinder basis. By determining individual cylinder air amounts, specifying cylinder fuel in terms of Lambda based on fueled cylinder events, and delivering spark based on fueled cylinder events, individual cylinder mixtures and combustion are better controlled. A person calibrating an engine using the routine in FIG. 2 can deliver discrete fuel amounts to individual cylinders or provide interpolated fuel amounts over a number of cylinder events. Since cylinder air amount is determined for each cylinder and since fuel delivery is a function of cylinder air amount and the number of fueled cylinder events, consistent in cylinder air-fuel mixtures result start after start.

Engine fuel delivery based on the number of fueled cylinder events may also be combined with other known methods to further reduce emissions. For example, introducing ambient air into the exhaust manifold to promote port oxidation or lean air-fuel mixtures accompanied by spark retard when catalyst temperatures are low.

Figure 3:
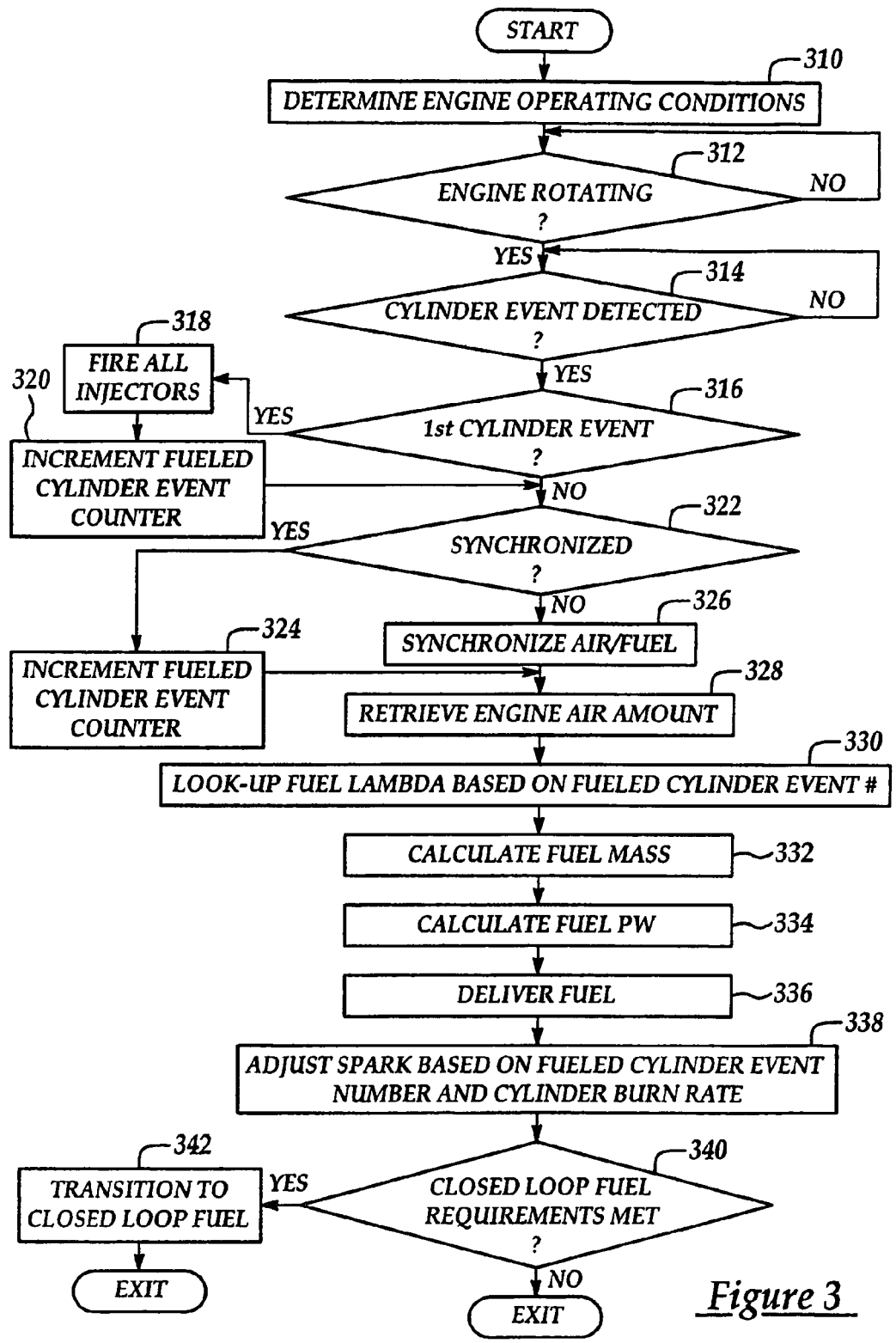
FIG. 3 is an alternate high level flow chart describing "Big Bang" starting and sequential fueled cylinder event based fueling after a start.

Referring to FIG. 3, a flowchart of an alternate embodiment of the number of fueled cylinder event based fuel control. In step 310, engine operating conditions are read. Operating conditions are determined by measuring engine coolant temperature, catalyst temperature, time since engine last operated (soak time), and parameters alike. These parameters are used to compensate the engine fuel request in blocks 318 and 330. The parameters influence engine operation in different ways depending on their state. For example, low engine coolant temperatures provide air-fuel enrichment, but higher engine coolant temperatures provide air-fuel enleanment.

In step 312, the routine decides to proceed based on whether the engine is rotating. If the engine is not rotating, the routine waits until the crank position sensor 118 detects engine rotation. If the engine is rotating, the routine proceeds to step 314. In step 314, the controller determines if a cylinder event has occurred, if so, the routine proceeds to step 316. If no new cylinder events have occurred, the routine waits until a cylinder event is observed.

In step 316, the routine determines if the cylinder event of the first engine cycle has occurred. If so, the routine proceeds to step 322. If not, the routine proceeds to step 318 where "Big Bang" fueling commences.

In step 318 all injectors fire, referred to as "Big Bang", delivering fuel to all cylinders regardless of individual cylinder valve timing. The amount of fuel delivered is a function of engine coolant temperature. The amount of fuel delivered increases as engine coolant temperature decreases. This method of starting provides the benefit of reduced starting time, but may increase emissions. The routine then proceeds to step 320 where fuel injection is delayed until the first cylinder to receive "Big Bang" fuel is fueled for the first event for the second cycle. The fueled cylinder event count is also incremented in step 320 as "Big Bang" fueled cylinder events occur. The routine then proceeds to step 322.

In step 322, controller 12 determines if synchronization between controller 12 and engine 10 has occurred. If synchronization has occurred, the routine proceeds to step 324, if not, the routine proceeds to step 326. The engine should be synchronized by the time all Big Bang fuel has been combusted.

In step 324, a fueled cylinder count is incremented since a cylinder event has been detected and the engine and controller 12 are in synchronization allowing fuel delivery. The number of fueled cylinder events is used as the row index when FNEVTCLD, FIG. 6, and FNEVTLOST, FIG. 7, are accessed to determine the desired Lambda value for the current fueled cylinder event.

In step 326, controller 12 observes cam and crank signals that allow determination of engine position. When engine position is established, engine controller 12 aligns operations, spark and fuel delivery, to engine timing, becoming synchronized. Fuel delivery is suspended for one engine cycle after Big Bang fuel is delivered so that Big Bang fuel can be combusted. Upon synchronization the routine continues to step 328 where an engine air amount prediction is retrieved from an engine air amount algorithm.

In step 328, an engine air amount for the next cylinder event is retrieved from an engine air amount algorithm. The intake manifold pressure 44 and intake manifold temperature 117 are sampled over an engine event and then a base individual cylinder air amount is calculated using the well-known ideal gas law equation PV=mRT. The ideal gas equation, written for a four-cylinder engine compensated for operating conditions is as follows:

$$Mcyl = \frac{D}{4RT} \cdot \eta(N, \text{load}) \cdot P_m \cdot FNBP(BP) \cdot FNTEM(ECT, ACT)$$

Where Mcyl is the engine air amount or cylinder air charge, D is the displacement of the engine, R is the gas constant, T is the engine air temperature. The symbol $\eta$ represents the engine volumetric efficiency, empirically determined, stored in a table with indices of engine speed and load. Manifold pressure, Pm is based on measuring a signal from pressure transducer 122. Barometric pressure compensation is stored as a function, FNBP, and is empirically determined so that it expresses the change in engine air amount as operating barometric pressure deviates from some nominal barometric pressure. Heat transfer between the engine and the engine air amount has an influence on volumetric efficiency and the engine air amount inducted. The table FNTEM is an empirically determined table that has x indices of engine coolant temperature (ECT) and y indices of engine air amount temperature (ACT). Based on these engine operating conditions, FNTEM provides compensation for heat transfer. The engine air amount is then used to calculate a predicted engine air amount since injection is typically done on a closed valve. The prediction is made by calculating the rate of change in air amount from the past two engine events, then using the rate of change and the duration between engine events to predict the future engine air amount. This example uses engine air amount in the current cylinder fuel calculation before the cylinder actually inducts the cylinder air charge. After the engine air amount has been retrieved the routine continues to step 330.

Alternatively, a mass air flow meter may be used to determine the engine air amount. By integrating the air mass signal over a cylinder event and then predicting future engine air amounts by extrapolation, using previous engine air amounts, a predicted engine air amount can be calculated.

In step 330, the desired Lambda for the up coming fueled cylinder event is calculated from tables FNEVTCLD, FIG. 6, and FNEVTLOST, FIG. 7. The tables have a row indices based on the number of fueled cylinder events and a column indices based on engine coolant temperature, or alternatively, cylinder head temperature. After the number of fueled cylinder events count is updated, in step 324, the count is used along with engine coolant temperature, from step 310, to determine the desired Lambda for the up coming fueling event. FNEVTCLD and FNEVTLOST values are interpolated by row and column to determine the desired up coming cylinder event Lambda. The desired Lambda is calculated by the equations: LAMBDA=BASEFUL−FNEVTCLD−FNEVTLOST, open loop, and by LAMBDA=BASEFUL−FNEVTLOST, closed loop. Lambda is separated into open and closed loop modes so that lost fuel can be taken into account in both modes of operation. When open loop, BASEFUL is the desired Lambda value interpolated from a table based on engine speed and load. When closed loop, BASEFUL takes on a value that dynamically moves about the value of one based on the state of oxygen sensor 76. In general, the row index, number of fueled cylinder events, is calibrated to provide individual cylinder Lambda values for the first few engine cycles, then Lambda values are interpolated over a number of fueled cylinder events as the number of fueled cylinder events increase. Lambda is defined as follows:

$$\text{Lambda } (\lambda) = \frac{\frac{Air}{Fuel}}{\frac{Air}{Fuel_{stoichiometry}}}$$

The column index, engine coolant temperature is calibrated to account for changes in fuel vaporization and lost fuel as the engine and valve temperatures vary. The use of number of fueled cylinder events and engine coolant temperature as indices into determining individual cylinder Lambda allows very fine control of engine fuel during starting.

Alternatively, catalyst temperature may be used as a factor in determining the desired air-fuel ratio. The inventors herein have also recognized that catalyst temperature can be used as a factor in determining fuel amount. When a catalyst is cold, lean air-fuel ratios and spark retard can be used to increase catalyst temperatures and reduce tailpipe emissions. When a catalyst is warm and the engine has been stopped, oxygen diffuses into the catalyst. This allows the engine to operate rich after a start for a period without significantly increasing tailpipe emissions. Operating the engine rich for a period reduces engine NOx production and prepares the catalyst for increased NOx created during increased load conditions. To compensate for catalyst temperature, the Lambda calculation is modified by another term, FNEVT-CAT. The desired Lambda equation with catalyst temperature compensation is: LAMBDA=BASEFUL−FNEVT-CLD−FNEVTLOST+FNEVTCAT, open loop, and by LAMBDA=BASEFUL−FNEVTLOST+FNEVTCAT, closed loop. The function FNEVTCAT is of the same form as FIG. 6, but the x indices is catalyst temperature instead of engine coolant temperature. The y index remains fueled cylinder events. By using catalyst temperature as a factor in determining engine air-fuel ratio, engine operation can be tuned to reduce tailpipe emissions. The routine then continues on to step 332.

In step 332, individual cylinder fuel mass is calculated based on the desired Lambda calculated in step 330 and predicted engine air amount retrieved from step 328. Base fuel mass is calculated as follows:

$$\text{Base\_Fuel\_Mass} = \frac{\text{Engine\_Air\_Amount}}{\frac{Air}{Fuel_{stoichiometry}} * \text{Lambda}}$$

The fuel mass to be injected is further modified to reflect that a portion of the injected fuel mass may go into the formation of a fuel puddle in the intake manifold and that a portion of the fuel puddle may enter the cylinder depending on operating conditions. The fuel entering the engine cylinder is calculated as described by Aquino in S.A.E paper 810494 as follows:

$$\text{Final\_Fuel\_Mass} = (1-X)*\text{Base\_Fuel\_Mass} + \frac{\text{Mass\_From\_Puddle}}{\text{Tau}}$$

The equation terms X and Tau represent the fraction of injected fuel entering the puddle X, and the time constant of the puddle, Tau. The terms are determined from values stored in tables whose values are empirically determined and based on manifold pressure, engine coolant temperature, and number of fueled cylinder events. The fuel puddle mass changes dynamically and is influenced by manifold pressure, engine temperature, and engine speed. The puddle mass increases at lower engine temperatures, higher manifold pressures, and low engine speeds. The puddle mass decreases at higher engine temperature, lower manifold pressures, and higher engine speeds. By keeping track of the fuel puddle mass and compensating for fuel entering or exiting the fuel puddle, the desired in cylinder air-fuel is created. The routine then proceeds to step 334.

In step 334, the fuel pulse width is determined from the calculated fuel mass and a function that represents time required to deliver a given fuel mass. The routine then continues on to step 336 where an injector is activated to deliver the desired fuel mass. The routine then advances to step 338.

In step 338, the routine passes the fueled cylinder event number to a spark delivery routine that can adjust spark based on the fueled cylinder event number and cylinder burn rate. Typically, desired spark is advanced if the burn rate is slower and retarded if the burn rate is faster. The burn rate is determined by the cylinder design and type of fuel, e.g., Gasoline, Ethanol, and Methanol. Base spark timing is retrieved from predetermined values stored in a table. The base spark table has x indices of engine coolant temperature and y indices of fueled cylinder events. If the burn rate of the fuel being used changes, a function FNBUR_SPK, alters the spark demand by adding an offset to the base spark. FNBUR_SPK is empirically determined and outputs spark offset as a function of burn rate. As the burn rate changes, depending on the fuel type, spark is advanced or retarded appropriately. In other words, the base spark angle that is based on the number of fueled cylinder events is modified based on cylinder burn rate. By linking spark angle to cylinder burn rate and fueled cylinder events, engine emissions can be reduced on a variety of fuel types. The routine then continues to step 340.

In step 340, engine operating conditions are evaluated to determine if closed loop fuel control is desired. Common signals used to determine desired closed loop engine operation include; time since start, exhaust gas sensor temperature, engine coolant temperature, and engine load. If closed loop fuel control is desired the routine proceeds to step 342 where fuel control transitions from open loop control to closed loop control by ramping fuel toward stoichiometry. If closed loop fuel control is not desired the routine exits until it is called again to determine fuel for the next cylinder.

Figure 4:
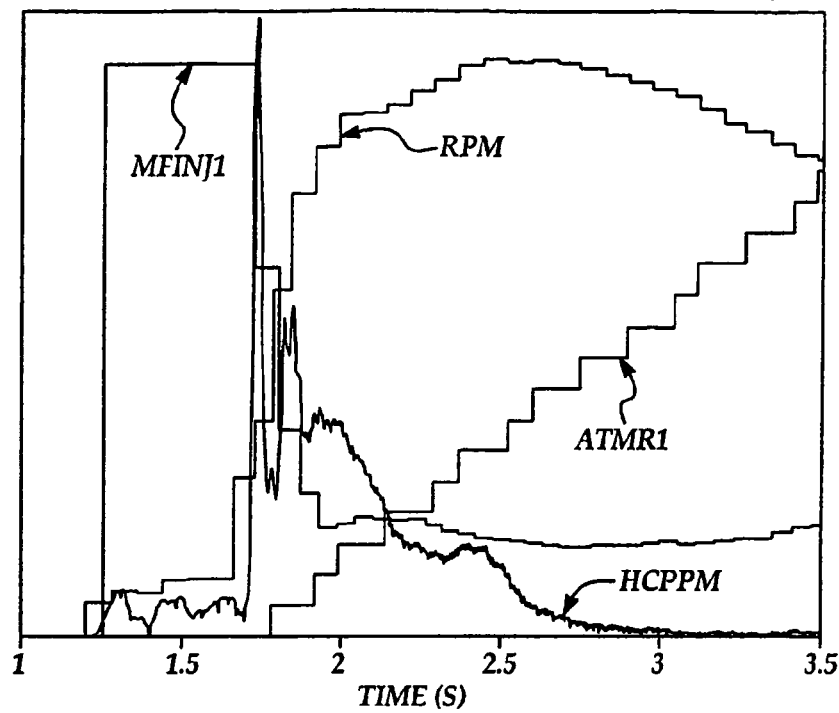
FIG. 4 is a plot showing an example of conventional time based fuel control and the hydrocarbon emissions produced during a start.
Figure 5:
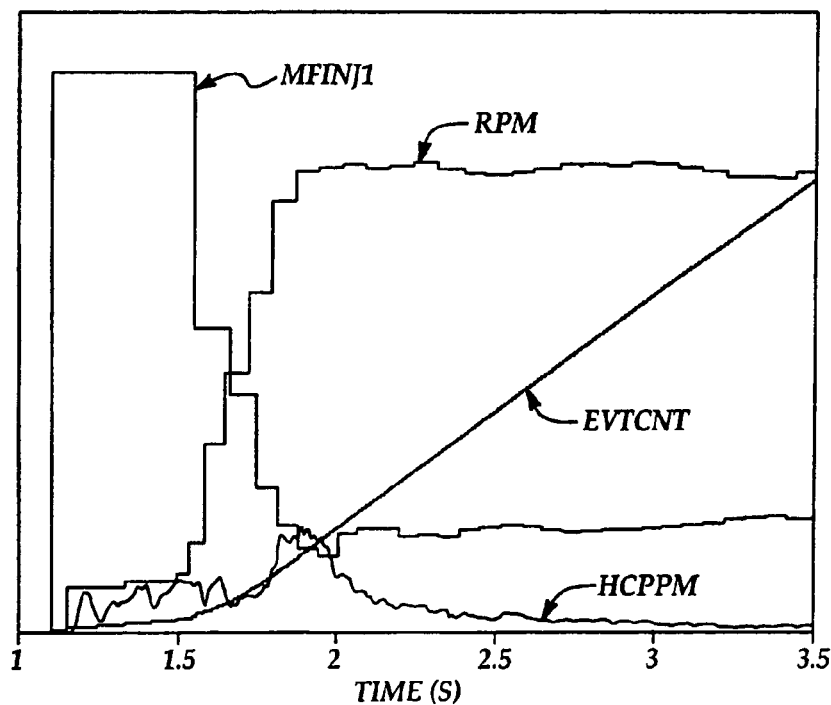
FIG. 5 is a plot showing fueled cylinder event based fuel control and the hydrocarbon emissions produced during a start.

Referring to FIG. 4, a plot showing parameters of interest during a start where conventional (only time based) spark is used to control a V6 engine. Signal magnitudes have been normalized so that the trajectories of the signals can be viewed together. FIGS. 4 and 5 are scaled equally to allow objective comparison of the two methods.

Engine speed (RPM), hydrocarbons (HCPPM), cylinder number one fuel mass injected (MFINJ1), and time since start (ATMR1) are plotted to show typical signal trajectories during a cold start. Notice the relationship between the signals. Fuel mass injected starts out large and decreases with time, it follows a trajectory described by a table with indices of engine coolant temperature and time since start. The delivered fuel is not directly correlated to the number of cylinder events. This approach results in higher hydrocarbon (HCPPM) emissions since individual events are not controlled. Note that signal ATMR1 increases linearly and is independent of engine speed or number of cylinder events.

Referring to FIG. 5, a plot showing the same parameters as FIG. 4, but where fueled cylinder event based fuel is used according to one embodiment of the present invention. Signal magnitudes have been normalized so that the trajectories of signals can be viewed together. Engine speed (RPM), Hydrocarbons (HCPPM), cylinder number one fuel mass injected (MFINJ1), and number of fueled cylinder events (EVTCNT) are plotted to show typical signal trajectories during a start. Each cylinder has a unique variable that describes the delivered fuel (MFINJ1-N), however, only cylinder one injection pulse width is displayed in FIG. 5. MFINJ1 is the mass of fuel injected to produce the desired Lambda, the output of FIG. 2, step 226. Notice the relationship between the signals, mass of fuel injected changes based on fueled cylinder event number (EVTCNT). MFINJ1 changes every six-cylinder event and follows a trajectory described by calculating Lambda, the output of FIG. 2, step 224. The delivered pulse width is linked to a specific synchronized fueled cylinder event which results in reduced hydrocarbon emissions while producing sufficient torque to run the engine speed up to idle.

Referring to FIG. 6, a table FNEVTCLD, showing example fuel subtracted from a base desired lambda based on engine coolant temperature and fueled cylinder event number. The table is used to determine the fuel to be subtracted from the base Lambda for a specific fueled cylinder event while the engine is operating in open loop fuel control. The table has x dimensions of engine temperature, in degrees Fahrenheit, and y dimensions of fueled cylinder event number. Typically, table columns are spaced to allow compensation for fuel vaporization and lost fuel; rows are defined by the resolution needed to support the combustion process. In general, enough rows are provided to control individual cylinder events over a number of fueled cylinder events.

Regarding, the shape of the columns, since the table value is subtracted from a base Lambda value, it starts at a value and then decreases as the number of fueled cylinder events and engine temperature increase. The effect of this shape is to provide fuel enrichment while the engine is cold. This improves combustion when the engine is cold.

Referring to FIG. 7, a table FNEVTLOST, showing example fuel subtracted from a desired Lambda based on engine coolant temperature and fueled cylinder event number. The table is used to determine the fuel to be subtracted from desired Lambda for a specific fueled cylinder event while the engine is operating in open loop or closed loop fuel control modes. The table has x dimensions of engine temperature, in degrees Fahrenheit, and y dimensions of fueled cylinder event number. The time to closed loop fuel control varies depending on engine operating conditions. Since FNEVTLOST functions during open and closed loop fuel control, it is calibrated, then FNEVTCLD is calibrated so that both tables provide the desired open loop function. In general, enough rows are provided to control individual cylinder events over the first two engine cycles, plus a few additional rows. The additional rows are used to define fuel over a number of fueled cylinder events, reflecting stabilization in the combustion process as the number of fueled cylinder events increases.

As will be appreciated by one of ordinary skill in the art, the routines described in FIGS. 2 and 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

This concludes the description of the invention. The reading of it by those skilled in the art would bring to mind many alterations and modifications without departing from the spirit and the scope of the invention. For example, I3, I4, I5, V6, V8, V10, and V12 engines operating in natural gas, gasoline, or alternative fuel configurations could use the present invention to advantage. Accordingly, it is intended that the scope of the invention is defined by the following claims:

The invention claimed is:

1. A fuel control method for a multi-cylinder internal combustion engine, comprising:
   injecting fuel at least onto closed intake valves from the start of the internal combustion engine;
   counting a number of consecutive combustion events of the cylinders from a start of said internal combustion engine;
   adjusting individual cylinder injected fuel amounts of each cylinder based on said counted number of cylinder combustion events;
   adjusting spark timing based on said counted number of cylinder combustion events; and
   treating combusted exhaust gasses in a catalytic converter coupled in an exhaust path of the engine.

2. The method as set forth in claim 1 wherein said injected fuel amount is further adjusted based on engine temperature.

3. The method as set forth in claim 1 wherein said injected fuel amount is further adjusted based on catalyst temperature.

4. The method as set forth in claim 1 wherein said injected fuel amount produces a lean air-fuel mixture during start.

5. The method as set forth in claim 1 wherein said injected fuel amount is injected asynchronous to engine valve operation at least once during start; and injecting fuel synchronous to said engine valve operation alter said start.

6. The method as set forth in claim 1 wherein said injected fuel amount delivery is synchronous to said engine valve timing.

7. The method as set forth in claim 1 wherein cylinder spark advance is adjusted based on said counted number of combustion events.

8. The method as set forth in claim 1 wherein said injected fuel amount is further adjusted based on time.

9. The method as set forth in claim 1 wherein said injected fuel amount is independent of said counted number of combustion events, depending on an operating condition.

10. A fuel control method for a multi-cylinder internal combustion engine, comprising:
   injecting fuel from the start of the internal combustion engine; counting a number of consecutive combustion events of the cylinders from a start of said internal combustion engine;
   adjusting individual cylinder injected fuel amounts of each cylinder based on said counted number of cylinder combustion events;
   adjusting spark timing based on said counted number of cylinder combustion events; and
   treating combusted exhaust gasses in a catalytic converter coupled in an exhaust path of the engine.

11. The method as set forth in claim 10 wherein said injected fuel amount is further adjusted based on engine temperature.

12. The method as set forth in claim 10 wherein said injected fuel amount is further adjusted based on catalyst temperature.

13. The method as set forth in claim 10 wherein said injected fuel amount produces a lean air-fuel mixture during start.

14. The method as set forth in claim 10 wherein said injected fuel amount is injected asynchronous to engine valve operation at least once during start; and injecting fuel synchronous to said engine valve operation after said start.

15. The method as set forth in claim 10 wherein said injected fuel amount delivery is synchronous to said engine valve timing.

16. The method as set forth in claim 10 wherein cylinder spark advance is adjusted based on said counted number of combustion events.

17. The method as set forth in claim 10 wherein said injected fuel amount is further adjusted based on time.

18. The method as set forth in claim 10 wherein said injected fuel amount is independent of said counted number of combustion events, depending on an operating condition.

* * * * *